United States Patent [19]

Aiken et al.

[11] 4,215,897
[45] Aug. 5, 1980

[54] TRUCK TARPAULIN DEVICE

[76] Inventors: John D. Aiken; Ben P. Aiken, both of R.D. #2, Portersville, Pa. 16051

[21] Appl. No.: 913,958

[22] Filed: Jun. 9, 1978

[51] Int. Cl.² .............................................. B60P 7/04
[52] U.S. Cl. .................................................. 296/100
[58] Field of Search ............... 296/100, 137 C, 137 D, 296/101, 98

[56] References Cited

U.S. PATENT DOCUMENTS

| | | | |
|---|---|---|---|
| 3,472,548 | 10/1969 | Comisac | 296/98 X |
| 3,658,378 | 4/1972 | Sutren | 296/137 C |
| 3,986,749 | 10/1976 | Hull et al. | 296/100 X |
| 4,067,603 | 1/1978 | Fenton | 296/100 |
| 4,138,154 | 2/1979 | McKeon | 296/98 |

*Primary Examiner*—John J. Love
*Assistant Examiner*—Norman L. Stack
*Attorney, Agent, or Firm*—Daniel J. Tick

[57] ABSTRACT

A plurality of slats are positioned atop the side walls of the cargo space of a truck and extend therebetween in parallel relation to the front and back walls and support a tarpaulin. The tarpaulin is extended over the top of the cargo space and folded, selectively, by controlling the direction of rotation of a motor which rotates cables mounted on the top of the side walls and affixed to the back slat.

1 Claim, 4 Drawing Figures

U.S. Patent — Aug. 5, 1980 — 4,215,897
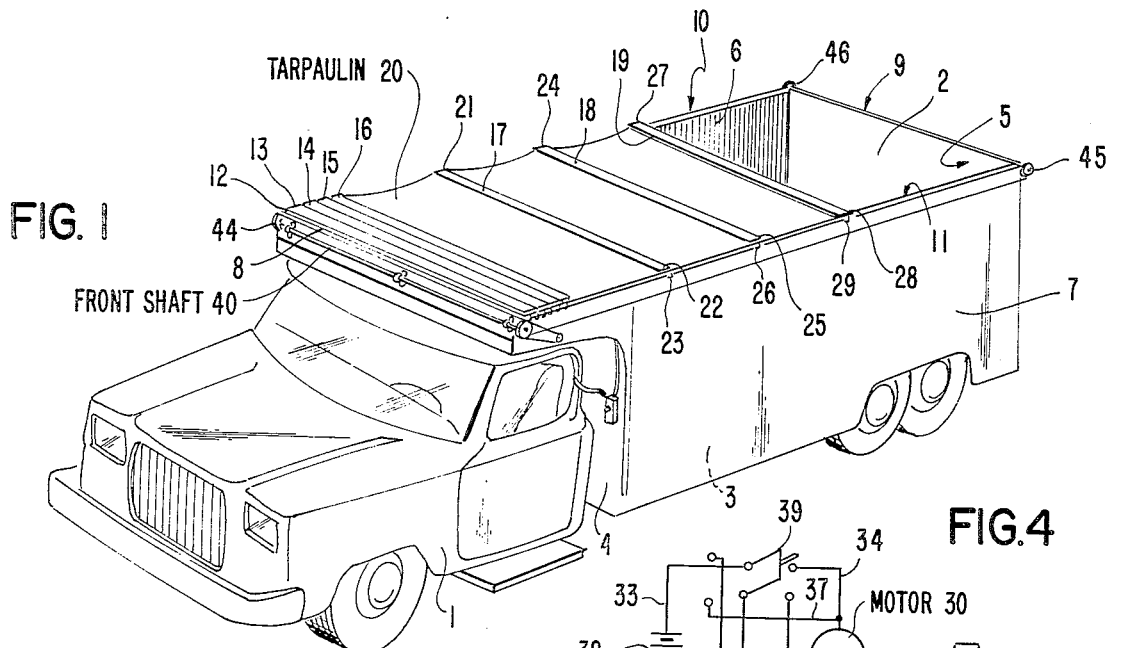
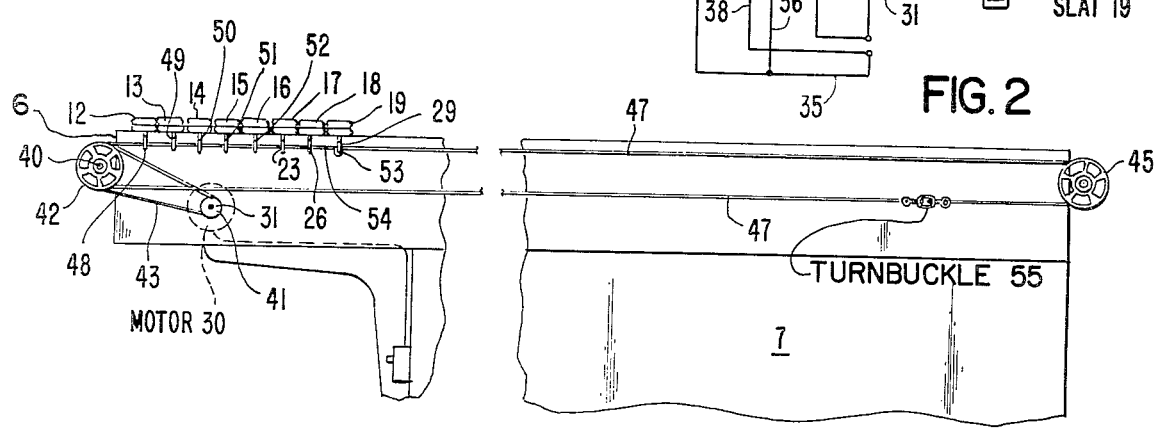
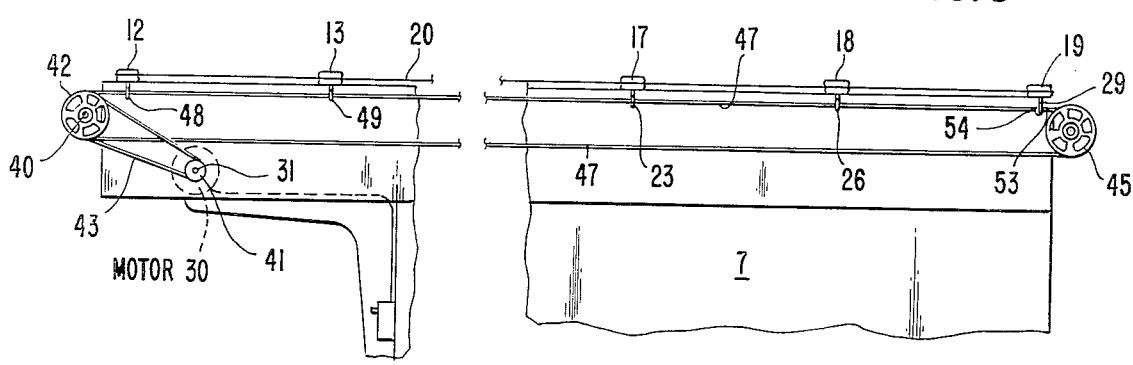

TRUCK TARPAULIN DEVICE

BACKGROUND OF THE INVENTION

The present invention relates to a truck tarpaulin device. More particularly, the invention relates to a truck tarpaulin device for a truck having a cargo space defined by a bed, a front wall, a back wall substantially parallel to the front wall and a pair of spaced parallel side walls substantially perpendicular to the front and back walls and extending substantially perpendicularly from the bed.

Truck tarpaulin devices are disclosed in U.S. Pat. Nos. 2,898,147; 3,467,743; 3,667,802; 3,759,568; 3,774,958 and 3,829,154.

Objects of the invention are to provide a truck tarpaulin device of simple structure, which is inexpensive in manufacture, installed with facility and convenience on specified types of trucks, regardless of their age, and functions efficiently, effectively and reliably to automatically cover the entire truck bed and automatically expose any part or all of the truck bed, as desired.

BRIEF DESCRIPTION OF THE DRAWINGS

In order that the invention may be readily carried into effect, it will now be described with reference to the accompanying drawings, wherein:

FIG. 1 is a perspective view of an embodiment of the truck tarpaulin device of the invention in use covering part of the bed of a truck;

FIG. 2 is a side view of the embodiment of FIG. 1 in completely folded condition exposing the entire truck bed;

FIG. 3 is a side view of the embodiment of FIG. 1 in completely extended position, completely covering the entire truck bed; and FIG. 4 is a circuit diagram of the truck tarpaulin device of the invention.

DETAILED DESCRIPTION OF THE INVENTION

The truck tarpaulin device of the invention is for a truck 1 (FIG. 1) having a cargo space 2 defined by a bed 3, a front wall 4, a back wall 5 substantially parallel to the front wall and a pair of spaced parallel side walls 6 and 7 substantially perpendicular to the front and back walls and extending substantially perpendicularly from the bed, as shown in FIG. 1. The front wall 4 has a top 8, the back wall 5 has a top 9 and the side walls 6 and 7 have top walls 10 and 11, respectively, as shown in FIG. 1. The top 8 is the cab protector of the truck.

The truck tarpaulin device of the invention comprises a plurality of slats 12, 13, 14, 15, 16, 17, 18 and 19, as shown in FIGS. 1 and 2. The slats 12 to 19 are positioned atop the side walls 6 and 7 and extend therebetween in substantially parallel relation to the front and back walls 4 and 5, as shown in FIG. 1, and support a tarpaulin 20 (FIGS. 1 and 3).

The slats 12 to 19 include a front slat 12 and a back slat 19. Each of the slats 12 to 19 has spaced opposite ends at the opposite side walls 6 and 7 and a pair of eye members, each at a corresponding end of each slat. Thus, as shown in FIG. 1, the slat 17 has spaced opposite ends 21 and 22 with an eye member at the end 21 (Not shown in the views of the FIGS.) and an eye member 23 at the end 22 thereof, as shown in FIGS. 1 to 3. The slat 18 has spaced opposite ends 24 and 25 with an eye member at the end 24 (not shown in the views of the FIGS.) and an eye member 26 at the end 25 thereof, as shown in FIGS. 1 to 3. The slat 19 has spaced opposite ends 27 and 28 with an eye member at the end 27 (not shown in the views of the FIGS.) and an eye member 29 at the end 28 thereof, as shown in FIGS. 1 to 3.

A reversible electric motor 30 (FIGS. 2 to 4) has a shaft 31. The motor 30 is energized by the battery 32 of the truck 1, or by a separate battery, if desired. The motor 30 is electrically connected to the battery 32 by electrical conductors 33, 34, 35, 36, 37, 38, in the manner shown in FIG. 4, via a double pole double throw switch 39, so that the operator may cause rotation of the motor 30 in either direction, clockwise or counterclockwise, as desired, by operating the switch to make contact with one side or the other. A front shaft 40 is rotatably mounted on the top 8 of the front wall 4 and extends parallel thereto. The front shaft 40 is coupled to the shaft 31 of the motor 30 by any suitable means such as, for example, a pulley wheel 41 affixed to, and rotatable with, the motor shaft 31, a pulley wheel 42, affixed to and rotatable with the front shaft 40, and a drive belt 43 coupling the pulley wheels to each other, in the manner shown in FIGS. 2 and 3. The front shaft 40 is thus rotatable by the motor 30 clockwise or counterclockwise.

The pulley wheel 42 is a front pulley wheel and is affixed to one end of the front shaft 40 and is located at the side wall 7, as shown in FIGS. 2 and 3. A second front pulley wheel 44 is affixed to the opposite end of the front shaft 40, as shown in FIG. 1, and is rotatable with said shaft, and is at the side wall 6 (FIG. 1).

A pair of rear pulley wheels 45 and 46 are rotatably affixed to the side walls 7 and 6, respectively, at the back wall 9 and adjacent the tops 11 and 10, respectively, of said side walls, as shown in FIG. 1.

A pair of cables are provided. Each of the cables extends around and completely encircles the front and rear pulley wheels of a corresponding side wall of the truck and extends through the eye members of the slats at such corresponding side wall. Each cable is clamped at one point to the eye member of the back slat 19 at the corresponding side wall 6 and 7, respectively, and each cable is clamped at another point to the eye member of the back slat at the corresponding side wall. The back slat 19 is affixed to the cables at the points 27 and 28 via cable clamps. The cable extends through all the other eye members in order to maintain alignment. Thus, although the cable around the front and rear pulley wheels 44 and 46 is not shown in the view of the FIGS., a cable 47, shown in FIGS. 2 and 3, which is identical to the other, unshown cable, extends around the front and rear pulley wheels 40 and 45 of the side wall 7 of the truck. The cable 47 extends through the eye members 48, 49, 50, 51, 52, 23, 26 and 29 of the slats 12 to 19, respectively, at the corresponding side wall 7. A point 53 of the cable 47 is clamped to the eye member 29 of the back slat 19 at the side wall 7, as shown in FIGS. 2 and 3. Another point 54 of the cable 47 is clamped to the eye member 29 of the back slat 19 at the side wall 7, as shown in FIGS. 2 and 3.

Adjustable turnbuckles 55 (FIG. 2) are utilized to maintain proper tension on the cables.

The motor control circuit, shown in FIG. 4, controls the rotation of the motor 30 in a desired direction whereby the back slat 19 is moved to the rear wall 5 in one direction of rotation of the motor thereby extending the tarpaulin 20 over the entire bed of the truck, and is moved to the front wall 40 in the opposite direction of rotation of the motor thereby folding the tarpaulin and completely uncovering the truck bed.

The tarpaulin 20 is affixed to the truck at points 56. One of the points 56 is shown in FIG. 2. The tarpaulin 20 thus folds up in accordian fashion at the points 56 and unfolds from said points.

The motor 30 is electrically connected to the battery via a pair of electrical wall-type outlets electrically connected to the battery and to the switch box of the motor, and a pair of electrical connector plugs electrically connected to the opposite ends of an electrical conductor for connecting the battery to the motor. This arrangement eliminates the wire which would otherwise extend from the hinge of the truck bed and back again.

While the invention has been described by means of a specific example and in a specific embodiment, we do not wish to be limited thereto, for obvious modifications will occur to those skilled in the art without departing from the spirit and scope of the invention.

We claim:

1. A truck tarpaulin device for a truck having a cargo space defined by a bed, a front wall, a back wall substantially parallel to the front wall and a pair of spaced parallel side walls substantially perpendicular to the front and back walls and extending substantially perpendicularly from the bed and having tops, said truck tarpaulin device comprising a plurality of slats positioned atop the side walls and extending therebetween in substantially parallel relation to the front and back walls and supporting a tarpaulin affixed to the truck at the top of the front wall of the cargo space, said slats including a front slat and a back slat, each of the slats having spaced opposite ends at the opposite side walls and a pair of eye members each at a corresponding end of each slat;

a reversible electric motor having a shaft;

a front shaft rotatably mounted atop the front wall and extending parallel thereto and coupled to the shaft of the motor whereby the front shaft is rotatable by the motor in opposite directions;

a pair of front pulley wheels affixed to the opposite ends of the front shaft and rotatable therewith, said front pulley wheels being at the opposite side walls;

a pair of rear pulley wheels rotatably affixed to the opposite side walls at the back wall;

a pair of cables each extending around the front and rear pulley wheels of a corresponding side wall of the truck and extending through the eye members of the slats at said corresponding side wall with one end of each cable affixed to the eye member of the back slat at said corresponding side wall and the other end of each cable affixed to the eye member of the back slat at said corresponding side wall; and motor control means for controlling the rotation of the motor in a desired direction whereby the back slat is moved to the rear wall in one direction of rotation of the motor thereby extending the tarpaulin over the entire bed and the back slat is moved to the front wall in the opposite direction of rotation of the motor thereby folding the tarpaulin.

* * * * *